United States Patent
Hamanaka et al.

(10) Patent No.: US 9,799,452 B2
(45) Date of Patent: Oct. 24, 2017

(54) CERAMIC ELECTRONIC COMPONENT AND METHOD OF MANUFACTURING THE SAME

(71) Applicant: Murata Manufacturing Co., Ltd., Nagaokakyo-shi, Kyoto-fu (JP)

(72) Inventors: Kenichi Hamanaka, Nagaokakyo (JP); Kota Zenzai, Nagaokakyo (JP); Taku Dekura, Nagaokakyo (JP); Kiyotaka Maegawa, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 398 days.

(21) Appl. No.: 14/305,117

(22) Filed: Jun. 16, 2014

(65) Prior Publication Data

US 2014/0373324 A1 Dec. 25, 2014

(30) Foreign Application Priority Data

Jun. 19, 2013 (JP) .................................. 2013-128281
Apr. 23, 2014 (JP) .................................. 2014-089213

(51) Int. Cl.
*H01G 4/30* (2006.01)
*H01G 4/232* (2006.01)
*H01G 4/12* (2006.01)

(52) U.S. Cl.
CPC .............. *H01G 4/30* (2013.01); *H01G 4/232* (2013.01); *H01G 4/2325* (2013.01); *H01G 4/12* (2013.01); *Y10T 29/435* (2015.01)

(58) Field of Classification Search
CPC  H01G 4/30; H01G 4/005; H01G 4/12; H01G 4/06; H01G 4/228
See application file for complete search history.

(56) References Cited

U.S. PATENT DOCUMENTS 9,202,640 B2 * 12/2015 Zenzai ..................... H01G 4/12
2001/0017420 A1 * 8/2001 Iwao ..................... H01F 17/0013
257/758
(Continued)

FOREIGN PATENT DOCUMENTS

JP 2008-42068 A 2/2008
JP 2013-118356 A 6/2013
(Continued)

OTHER PUBLICATIONS

Official Communication issued in corresponding Korean Patent Application No. 10-2014-0068366, dated Oct. 12, 2015.
(Continued)

*Primary Examiner* — Nguyen Ha
(74) *Attorney, Agent, or Firm* — Keating & Bennett, LLP (57) ABSTRACT

A ceramic electronic component includes a rectangular or substantially rectangular parallelepiped-shaped stack in which a ceramic layer and an internal electrode are alternately stacked and an external electrode provided on a portion of a surface of the stack and electrically connected to the internal electrode. The external electrode includes an inner external electrode covering a portion of the surface of the stack and including a mixture of a resin component and a metal component and an outer external electrode covering the inner external electrode and including a metal component. The inner external electrode includes a plurality of holes. An average opening diameter of the plurality of holes is not greater than about 2.5 µm. Some or all of the plurality of holes are embedded with the metal component of the outer external electrode.

8 Claims, 6 Drawing Sheets

(56) References Cited

U.S. PATENT DOCUMENTS

| | | | |
|---|---|---|---|
| 2006/0044098 A1 | 3/2006 | Kimura et al. | |
| 2013/0058002 A1* | 3/2013 | Oh | H01G 4/30 361/301.4 |
| 2013/0106560 A1 | 5/2013 | Zenzai et al. | |
| 2013/0107421 A1 | 5/2013 | Zenzai et al. | |

FOREIGN PATENT DOCUMENTS

| | | |
|---|---|---|
| JP | 2013-118358 A | 6/2013 |
| WO | 2004/053901 A1 | 6/2004 |

OTHER PUBLICATIONS

Official Communication issued in corresponding Japanese Patent Application No. 2014-089213, dated Aug. 16, 2016.

* cited by examiner

CERAMIC ELECTRONIC COMPONENT AND METHOD OF MANUFACTURING THE SAME

BACKGROUND OF THE INVENTION

1. Field of the Invention

The present invention relates to a ceramic electronic component and a method of manufacturing the same.

2. Description of the Background Art

Ceramic electronic components represented by stack ceramic capacitors have recently been used in an environment that is more severe than in a conventional example.

For example, electronic components included in mobile devices such as a portable telephone and a portable music player are required to be resistant to shock at the time of a drop. Specifically, electronic components are required not to be detached from a mounting board and to be free from cracks when a drop impact is applied thereto.

Electronic components included in car-mounted devices such as an ECU (Engine Control Unit) are required to be resistant to a shock originating from a heat cycle. Specifically, electronic components are required to be free from cracks in solder used for mounting and in the electronic components themselves when bending stress resulting from thermal expansion and contraction of amounting board originating from a heat cycle is applied thereto.

In order to satisfy the requirements above, use of a thermosetting conductive paste for an external electrode of a ceramic electronic component, instead of a conventional firing-type conductive paste, has been proposed.

WO2004/053901 discloses a stack ceramic electronic component having an external electrode formed of a thermosetting conductive paste.

In the stack ceramic electronic component described in WO2004/053901, an external electrode is formed through plating of an external electrode layer formed of a thermosetting conductive paste containing a resin and metal powders having a melting point not higher than 300° C.

In general, a resin is high in hygroscopicity and tends to absorb moisture. As a resin which has absorbed moisture is heated, moisture is vaporized and water vapor is generated in the resin, and in addition, some of the resin is decomposed to generate a decomposition gas.

In a case that an external electrode is formed through plating of an external electrode layer formed of a thermosetting conductive paste containing a resin as in the stack ceramic electronic component described in WO2004/053901, heating in a reflow step in mounting the stack ceramic electronic component leads to generation of water vapor and a decomposition gas in the external electrode. The water vapor and the decomposition gas are confined by a plating film on a surface of the external electrode.

In a case that a defective portion or a partially thin portion is present in a plating film, the confined water vapor and decomposition gas may burst from the defective portion or the thin portion to the outside of the external electrode. The burst causes such a phenomenon that solder molten in the reflow step is blown off, which is generally called "solder burst".

In a case that a thermosetting conductive paste is directly applied to a ceramic stack as in the stack ceramic electronic component described in WO2004/053901, moisture contained in the ceramic stack is absorbed in the resin in the external electrode. Then, an amount of water vapor generated during heating increases, and solder burst is more likely.

SUMMARY OF THE INVENTION

Preferred embodiments of the present invention provide a ceramic electronic component and a method of manufacturing the same, to significantly reduce or prevent the occurrence of solder burst.

A ceramic electronic component according to a preferred embodiment of the present invention includes a rectangular or substantially rectangular parallelepiped-shaped stack in which a ceramic layer and an internal electrode are alternately stacked and an external electrode provided on a portion of a surface of the stack and electrically connected to the internal electrode. The external electrode includes an inner external electrode covering a portion of the surface of the stack and including a mixture of a resin component and a metal component and an outer external electrode covering the inner external electrode and including a metal component. The inner external electrode includes a plurality of holes. The plurality of holes have an average opening diameter not greater than about 2.5 µm, for example. Some or all of the plurality of holes are embedded with the metal component of the outer external electrode.

According to a preferred embodiment of the present invention, the outer external electrode covers the inner external electrode at a coverage factor not lower than about 99.8%, for example.

A method of manufacturing a ceramic electronic component according to another preferred embodiment of the present invention includes the steps of preparing a rectangular or substantially rectangular parallelepiped-shaped stack in which a ceramic layer and an internal electrode are alternately stacked and providing an external electrode on a portion of a surface of the stack so as to electrically be connected to the internal electrode. The step of providing an external electrode includes the steps of providing an inner external electrode by applying a mixture of a resin component and a metal component so as to cover a portion of the surface of the stack and heating the stack onto which the mixture has been applied and providing an outer external electrode by plating the inner external electrode with a metal component so as to cover the inner external electrode. In the step of providing an inner external electrode, a plurality of holes having an average opening diameter not greater than about 2.5 µm are formed in an outer surface of the inner external electrode through heating of the stack. In the step of providing an outer external electrode, some or all of the plurality of holes are embedded with the metal component of the outer external electrode.

The metal component of the outer external electrode preferably is Ni, for example.

The inner external electrode preferably includes, as the metal component, a first metal component and a second metal component higher in melting point than the first metal component, for example.

The first metal component preferably is Sn and the second metal component is Ag or Cu, for example.

A content of the first metal component in the mixture preferably is not lower than about 20 weight % and not higher than about 40 weight %, for example.

A content of the second metal component in the mixture preferably is not lower than about 30 weight % and not higher than about 70 weight %, for example.

A temperature for heating the stack in the step of providing an inner external electrode preferably is not lower than about 450° C., for example.

In the step of providing an inner external electrode, the stack preferably is heated in an atmosphere in which a concentration of oxygen is not higher than about 100 ppm, for example.

According to various preferred embodiments of the present invention, the occurrence of solder burst is significantly reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A ceramic electronic component according to various preferred embodiments of the present invention will be described hereinafter with reference to the drawings. In the description of the preferred embodiments below, the same or corresponding elements in the drawings have the same reference numerals allotted and description thereof will not be repeated. Though a ceramic capacitor preferably is described as a ceramic electronic component in the description below, the electronic component is not limited to a capacitor, and the electronic component includes a piezoelectric component, a thermistor, or an inductor, for example.

Figure 1:
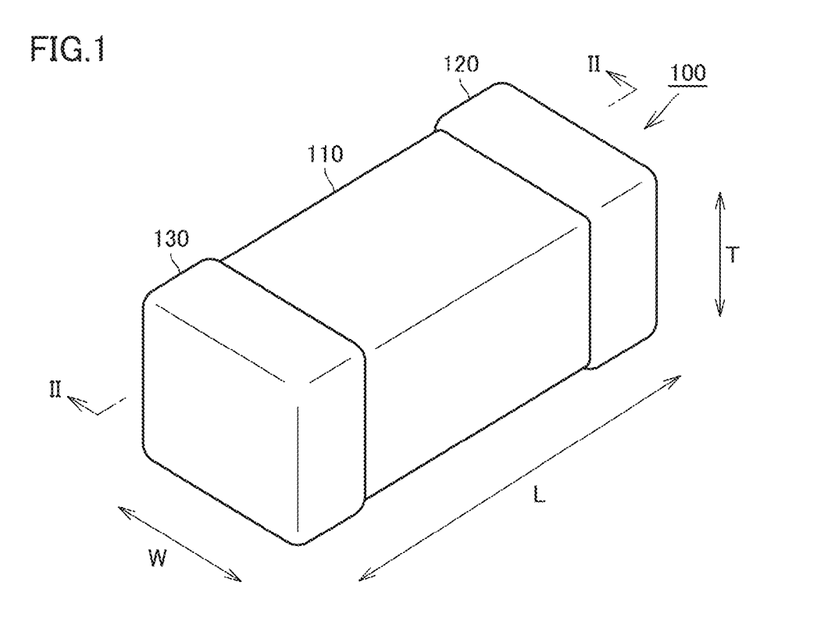
FIG. 1 is a perspective view showing appearance of a ceramic electronic component according to a preferred embodiment of the present invention.
Figure 2:
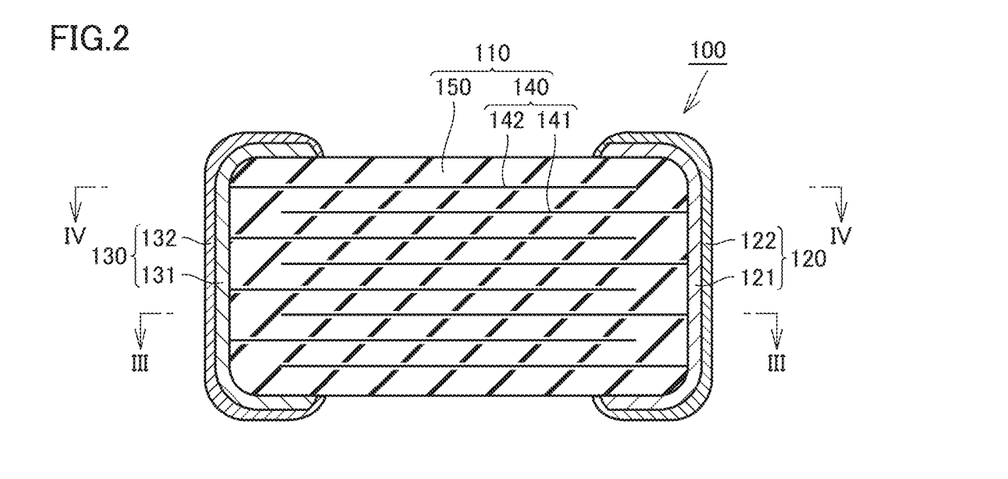
FIG. 2 is a cross-sectional view of the ceramic electronic component in FIG. 1 viewed in a direction shown with an arrow along the line II-II.
Figure 3:
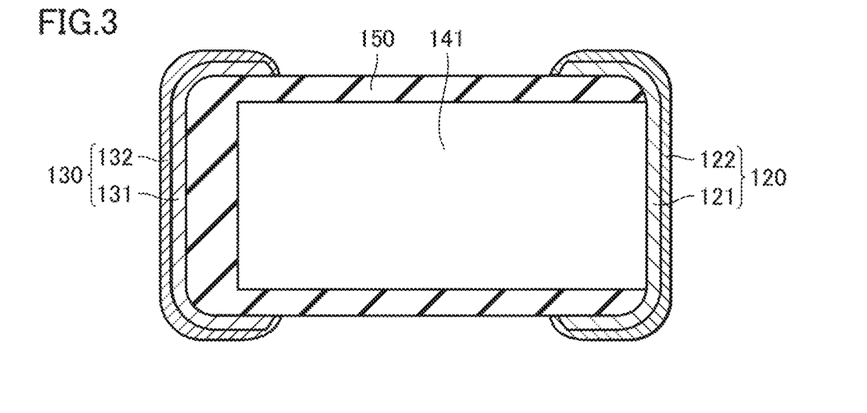
FIG. 3 is a cross-sectional view of the ceramic electronic component in FIG. 2 viewed in a direction shown with an arrow along the line III-III.
Figure 4:
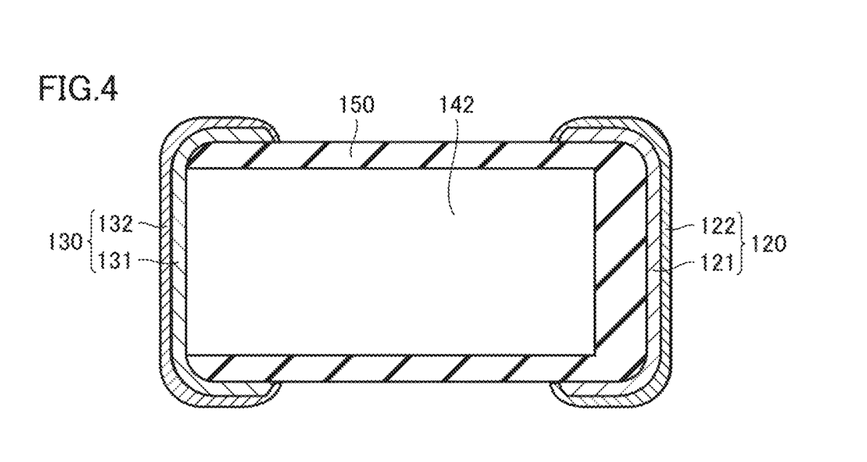
FIG. 4 is a cross-sectional view of the ceramic electronic component in FIG. 2 viewed in a direction shown with an arrow along the line IV-IV.

FIG. 1 is a perspective view showing appearance of a ceramic electronic component according to a preferred embodiment of the present invention. FIG. 2 is a cross-sectional view of the ceramic electronic component in FIG. 1 viewed in a direction shown with an arrow along the line II-II. FIG. 3 is a cross-sectional view of the ceramic electronic component in FIG. 2 viewed in a direction shown with an arrow along the line III-III. FIG. 4 is a cross-sectional view of the ceramic electronic component in FIG. 2 viewed in a direction shown with an arrow along the line IV-IV. FIG. 1 shows a longitudinal direction L of a stack which will be described later, a width direction W of the stack, and a thickness direction T of the stack.

As shown in FIGS. 1 to 4, a ceramic electronic component 100 according to a preferred embodiment of the present invention includes a rectangular or substantially rectangular parallelepiped-shaped stack 110 in which a ceramic layer 150 and a flat-plate-shaped internal electrode 140 are alternately stacked and an external electrode provided on a portion of a surface of stack 110 and electrically connected to internal electrode 140.

In the present preferred embodiment, the external electrode is provided in each of opposing end portions of stack 110. Specifically, the external electrode includes a first external electrode 120 provided in one end portion in a longitudinal direction of stack 110 and a second external electrode 130 provided in the other end portion in the longitudinal direction of stack 110.

Of internal electrodes 140 opposed adjacently to each other, a first internal electrode 141 is electrically connected to first external electrode 120, and a second internal electrode 142 is electrically connected to second external electrode 130.

In stack 110 according to the present preferred embodiment, a direction of stack of ceramic layer 150 and internal electrode 140 is perpendicular or substantially perpendicular to longitudinal direction L of stack 110 and width direction W of stack 110. Namely, a direction of stack of ceramic layer 150 and internal electrode 140 is in parallel or substantially parallel to thickness direction T of stack 110.

Stack 110 includes a pair of main surfaces perpendicular or substantially perpendicular to thickness direction T, a pair of end surfaces perpendicular or substantially perpendicular to longitudinal direction L, and a pair of side surfaces perpendicular or substantially perpendicular to width direction W.

As described above, though stack 110 preferably has an outer shape of a rectangular or substantially rectangular parallelepiped, it may be rounded in a corner portion. Any surface of the pair of main surfaces, the pair of side surfaces, and the pair of side surfaces may include projections and recesses formed.

Each ceramic layer 150 preferably has a thickness preferably not smaller than about 0.5 μm and not greater than about 10 μm, for example. As a material for forming ceramic layer 150, dielectric ceramics mainly including $BaTiO_3$, $CaTiO_3$, $SrTiO_3$, or $CaZrO_3$ preferably are used, for example. A material in which a Mn compound, a Fe compound, a Cr compound, a Co compound, or a Ni compound is added as a sub component to such a main component preferably are used, for example.

In a case that an electronic component is a piezoelectric component, stack 110 is preferably made of piezoelectric ceramics. For example, PZT (lead zirconate titanate)-based ceramics is available as piezoelectric ceramics.

In a case that an electronic component is a thermistor, stack 110 is preferably made of semiconductor ceramics. For example, spinel-type ceramics is available as semiconductor ceramics.

In a case that an electronic component is an inductor, stack 110 is preferably made of magnetic ceramics. For example, ferrite ceramics is available as magnetic ceramics.

Each internal electrode 140 preferably has a thickness preferably not smaller than about 0.2 μm and not greater than about 2.0 μm, for example. Internal electrode 140 includes first internal electrode 141 with a rectangular or substantially rectangular shape in a two-dimensional view and second internal electrode 142 with a rectangular or substantially rectangular shape in a two-dimensional view. First internal electrode 141 and second internal electrode 142 are alternately arranged at regular intervals along thickness direction T of stack 110. First internal electrode 141 and second internal electrode 142 are arranged to be opposed to each other, with ceramic layer 150 located therebetween.

First internal electrode 141 extends from one end portion in the longitudinal direction of stack 110 toward the other end portion. As shown in FIG. 3, first internal electrode 141 is connected to first external electrode 120 in one end surface of stack 110.

Second internal electrode 142 extends from the other end portion in the longitudinal direction of stack 110 toward one end portion. As shown in FIG. 4, second internal electrode 142 is connected to second external electrode 130 in the other end surface of stack 110.

As a material for forming internal electrode 140, a metal such as Ni, Cu, Ag, Pd, or Au or an alloy containing at least one of these metals such as an alloy of Ag and Pd preferably is used, for example. A material forming internal electrode 140 forms an alloy as a result of chemical combination with a first metal component contained in a mixture forming an inner external electrode which will be described later.

The external electrode includes an inner external electrode covering each of opposing end portions of stack 110 and including a mixture of a resin component and a metal component and an outer external electrode covering the inner external electrode and including a metal component. As a resin component, a thermosetting resin such as an epoxy resin or a phenol resin preferably is used, for example. A thickness of the inner external electrode preferably is preferably not smaller than about 5.0 μm and not greater than about 70.0 μm, for example.

As shown in FIGS. 2 to 4, first external electrode 120 includes a first inner external electrode 121 and a first outer external electrode 122. First inner external electrode 121 covers one end portion in the longitudinal direction of stack 110. A portion of first inner external electrode 121 forms an alloy together with a portion of first internal electrode 141.

Second external electrode 130 includes a second inner external electrode 131 and a second outer external electrode 132. Second inner external electrode 131 covers the other end portion in the longitudinal direction of stack 110. A portion of second inner external electrode 131 forms an alloy together with a portion of second internal electrode 142.

In the present preferred embodiment, the inner external electrode preferably includes, as a metal component, a first metal component and a second metal component higher in melting point than the first metal component. A melting point of the first metal component is preferably not higher than about 550° C. and further preferably not lower than about 180° C. and not higher than about 340° C., for example. A melting point of the second metal component is preferably not lower than about 850° C. and not higher than about 1050° C., for example.

As the first metal component, a metal such as Sn, In, or Bi or an alloy containing at least one of these metals preferably is used, for example. As the first metal component, an alloy containing Sn such as an alloy of Sn and Ag, an alloy of Sn and Bi, or an alloy of Sn, Ag, and Cu, or Sn is preferably used. By using such a metal component, an alloy layer of internal electrode 140 and the inner external electrode are easily formed, and hence electrical connection between internal electrode 140 and the inner external electrode is easily established.

The first metal component is softened and fluidized through heating in a reflow step in mounting ceramic electronic component 100, and chemically combined with a material forming internal electrode 140 to thus form an alloy.

A content of the first metal component in a heated and cured mixture is preferably not lower than about 8 volume % and not higher than about 18 volume %, for example.

As the second metal component, a metal such as Ag, Cu, Pd, Pt, or Au or an alloy containing at least one of these metals is preferably used. As the second metal component, an alloy containing Ag such as an alloy of Ag and Pd, or Ag, or Cu is preferably used.

The second metal component defines a conduction path within the inner external electrode. The second metal component forms an alloy as a result of chemical combination with the first metal component. A content of the second metal component in a heated and cured mixture is preferably not lower than about 19 volume % and not higher than about 25 volume %, for example.

First outer external electrode 122 covers first inner external electrode 121. A portion of first outer external electrode 122 forms an alloy together with a portion of first inner external electrode 121. Second outer external electrode 132 covers second inner external electrode 131. A portion of second outer external electrode 132 forms an alloy together with a portion of second inner external electrode 131.

In the present preferred embodiment, a metal component of the outer external electrode is Ni. A metal component of the outer external electrode is not limited to Ni, and it may be Cu, for example. The outer external electrode functions as a solder barrier layer. A thickness of the outer external electrode is preferably not smaller than about 1.0 μm and not greater than about 15.0 μm, for example.

In the present preferred embodiment, the external electrode further includes a not-shown surface external electrode covering the outer external electrode. As a material for forming the surface external electrode, a metal such as Sn or Au having good solder wettability or an alloy containing at least one of these metals is preferably used. A thickness of the surface external electrode is preferably not smaller than about 1.0 μm and not greater than about 15.0 μm, for example.

In ceramic electronic component 100 according to the present preferred embodiment having the features above, the inner external electrode includes a plurality of holes at a boundary between the inner external electrode and the outer external electrode. An average opening diameter of the plurality of holes is not greater than about 2.5 μm, for example. Some or all of the plurality of holes are embedded with the metal component of the outer external electrode.

By setting an average opening diameter of the plurality of holes in the inner external electrode to about 2.5 μm or smaller, for example, in forming the outer external electrode on the inner external electrode with plating, most of the plurality of holes are embedded through lateral growth of Ni which is a metal component of the outer external electrode. Consequently, a dense outer external electrode is provided. As the outer external electrode is densely formed, a crystal of a metal tends to grow on the outer external electrode, and hence a dense plating film which serves as a surface external electrode is formed on the external electrode.

As described above, in ceramic electronic component 100 according to the present preferred embodiment, the outer external electrode preferably is formed substantially uniformly on the inner external electrode and covers the inner external electrode at a coverage factor not lower than about 99.8%, for example. More specifically, a ratio occupied by a defective portion not covered with the outer external electrode in an outer surface of the inner external electrode is lower than about 0.2%, for example.

By thus covering the inner external electrode substantially uniformly with the outer external electrode having substantially no defective portion, most of water vapor generated as a result of vaporization of moisture and a decomposition gas generated as a result of decomposition of the resin component in the inner external electrode is confined in the external electrode by the outer external electrode. Solder burst is thus significantly reduced or prevented.

Because the inner external electrode includes a resin component, it functions as a buffer layer. More specifically, when a physical shock or a shock originating from a heat cycle is applied to ceramic electronic component 100, the resin component in the inner external electrode absorbs the shock. Consequently, the occurrence of a crack in solder used for mounting and in ceramic electronic component 100 itself is significantly reduced or prevented.

In a case that an amount of the resin component in the inner external electrode is large, an amount of moisture absorbed in the resin component is large and solder burst is likely, which is not preferred. Therefore, an amount of the resin component in the inner external electrode should preferably be small within such a range that the inner external electrode functions as a buffer layer.

From the point of view, in a case that ceramic electronic component 100 has an outer dimension of a length not smaller than about 0.57 mm and not greater than about 0.65 mm, a width not smaller than about 0.27 mm and not greater than about 0.35 mm, and a thickness not smaller than about 0.27 mm and not greater than about 0.35 mm, a volume occupied by the resin component in the inner external electrode is preferably not higher than about $1.0 \times 10^{-6}$ ml, for example.

Similarly, in a case that ceramic electronic component 100 has an outer dimension of a length not smaller than about 0.95 mm and not greater than about 1.25 mm, a width not smaller than about 0.45 mm and not greater than about 0.70 mm, and a thickness not smaller than about 0.45 mm and not greater than about 0.70 mm, a volume occupied by the resin component in the inner external electrode is preferably not higher than about $3.3 \times 10^{-6}$ ml, for example.

Similarly, in a case that ceramic electronic component 100 has an outer dimension of a length not smaller than about 1.5 mm and not greater than about 1.8 mm, a width not smaller than about 0.7 mm and not greater than about 1.0 mm, and a thickness not smaller than about 0.7 mm and not greater than about 1.0 mm, a volume occupied by the resin component in the inner external electrode is preferably not higher than about $8.4 \times 10^{-6}$ ml.

Here, a non-limiting example of a method of calculating a volume of a resin component in an inner external electrode will be described. Initially, a weight of stack 110 is measured. Then, an amount of increase from the weight of stack 110 is calculated by measuring a weight of the stack after the mixture paste was applied. The amount of increase is the weight of the applied, uncured mixture paste. A weight of a resin contained in the uncured mixture paste is calculated by multiplying the weight of the uncured mixture paste by a weight ratio (a content) of the resin in the uncured mixture paste.

A thermogravimetric/differential thermal analyzer (TG-DTA) is used to measure in advance a weight of the uncured resin component and a weight of the cured resin component with a temperature condition being varied. As a result of the measurement, tendency of transition of a weight of the resin component in heating at a firing temperature is determined. Specifically, a rate of decrease in weight of the resin component in heating at a firing temperature is determined. Instead of the thermogravimetric/differential thermal analyzer (TG-DTA), a thermogravimetry mass spectrometer (TG-MS) may be used to measure a weight of the uncured resin component and a weight of the cured resin component with a temperature condition being varied.

An amount of decrease of the cured resin is calculated by multiplying a rate of decrease in weight of the resin component determined in advance by a weight of the uncured resin. Therefore, a weight of a resin contained in the cured mixture paste, that is, in the inner external electrode, is calculated by subtracting an amount of decrease in cured resin from the weight of the resin contained in the uncured mixture paste. A volume of the resin contained in the inner external electrode is calculated by dividing the weight of the cured resin by density of the cured resin.

Figure 5:
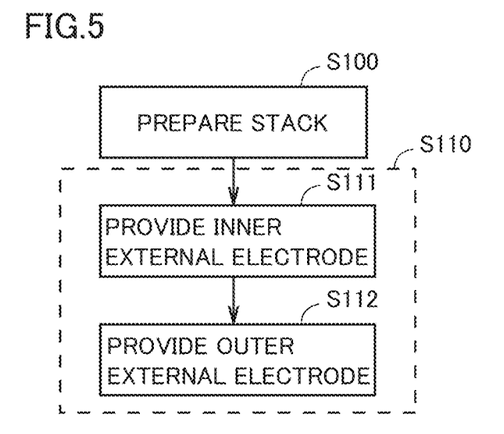
FIG. 5 is a flowchart showing a method of manufacturing a ceramic electronic component according to a preferred embodiment of the present invention.

A method of manufacturing a ceramic electronic component according to one preferred embodiment of the present invention will be described below with reference to the drawings. FIG. 5 is a flowchart showing a method of manufacturing a ceramic electronic component according to one preferred embodiment of the present invention.

As shown in FIG. 5, rectangular or substantially rectangular parallelepiped-shaped stack 110 in which ceramic layer 150 and internal electrode 140 are alternately stacked is prepared (S100). Stack 110 is preferably fabricated as described below, for example.

Initially, a ceramic green sheet is fabricated by applying a ceramic paste containing ceramic powders into a sheet with screen printing and drying the paste.

In some of a plurality of fabricated ceramic green sheets, a conductive paste for forming an internal electrode is applied onto the ceramic green sheet in a prescribed pattern with screen printing. Thus, a ceramic green sheet including a conductive pattern to define an internal electrode formed thereon and a ceramic green sheet not having a conductive pattern formed thereon are prepared. The ceramic paste and the conductive paste used to form an internal electrode may contain a binder and a solvent which are known.

A mother stack is fabricated by stacking a prescribed number of ceramic green sheets not having a conductive pattern formed thereon, successively stacking thereon a plurality of ceramic green sheets having a conductive pattern formed thereon, and stacking further thereon a prescribed number of ceramic green sheets not having a conductive pattern formed thereon. A mother stack may be pressed in a direction of stack using isostatic pressing as necessary, for example.

By cutting and dividing the mother stack in a prescribed shape, a plurality of rectangular or substantially rectangular parallelepiped-shaped soft stacks are fabricated. A rectangular or substantially rectangular parallelepiped-shaped soft stack may be subjected to barrel polishing so as to round a corner portion of the soft stack.

Stack 110 is fabricated by curing the soft stack by firing the same. A firing temperature is set as appropriate depending on a type of a ceramic material and a conductive material, and for example, a temperature is preferably set within a range not lower than about 900° C. and not higher than about 1300° C.

Then, a mixture paste which is a mixture containing a resin component such as a thermosetting resin, a first metal filler including a first metal component, and a second metal filler including a second metal component higher in melting point than the first metal component is prepared. A weight ratio (a content) of the first metal filler to a total weight of the first metal filler, the second metal filler, and the resin component in the mixture paste is preferably not lower than about 20 weight % and not higher than about 40 weight % and more preferably not lower than about 22.0 weight % and not higher than about 37.2 weight %, for example.

In a case that a content of the first metal filler is too low, an amount of an alloy formed as a result of chemical combination with a material forming internal electrode 140 is insufficient, and electrical connection between internal electrode 140 and the external electrode cannot be ensured.

In a case that a content of the first metal filler is too high, an amount of the first metal filler which does not react with the second metal filler but remains increases. In the case, the external electrode may deform due to heating in a reflow step in mounting ceramic electronic component 100. A shape of the first metal filler is not particularly limited, and it may be spherical or flat.

An average particle size of the first metal filler is not greater than about 2.5 μm, for example. By setting an average particle size of the first metal filler to about 2.5 μm or smaller, for example, the plurality of holes can have an average opening diameter not greater than about 2.5 μm, for example. This is because a hole is formed in such a manner that a portion where the first metal filler is located is hollowed owing to flux of the molten first metal filler. An average particle size of the first metal filler refers to a particle size at about 50% of an integrated value in particle size distribution determined with a laser diffraction/scattering method.

A weight ratio (a content) of the second metal filler to a total weight of the first metal filler, the second metal filler, and the resin component in the mixture paste is preferably not lower than about 30 weight % and not higher than about 70 weight % and more preferably not lower than about 41.2 weight % and not higher than about 64 weight %, for example.

In a case that a content of the second metal filler is too low, conductivity of the external electrode is lowered and equivalent series resistance (ESR) of ceramic electronic component 100 may become high.

In a case that a content of the second metal filler is too high, a content of the resin component in the inner external electrode is low, and the inner external electrode may not function as a buffer layer. A shape of the second metal filler is not particularly limited, and it may be spherical or flat, for example. An average particle size of the second metal filler is not particularly limited, and for example, it may be not smaller than about 0.5 μm and not greater than about 5.0 μm. An average particle size of the second metal filler refers to a particle size at about 50% of an integrated value in particle size distribution found with a laser diffraction/scattering method.

A weight ratio (a content) of the resin component to a total weight of the first metal filler, the second metal filler, and the resin component in the mixture paste is preferably not lower than about 5 weight % and not higher than about 40 weight % and more preferably not lower than about 9.8 weight % and not higher than about 31.5 weight %, for example.

In a case that a content of the resin component is too low, the inner external electrode may not function as a buffer layer. In a case that a content of the resin component is too high, conductivity of the external electrode is lowered and equivalent series resistance (ESR) of ceramic electronic component 100 may become high.

The inner external electrode is provided by applying the mixture paste to a portion of the surface of stack 110 with various printing methods or dipping and heating stack 110 to which the mixture paste has been applied (S111).

In the step of providing an inner external electrode (S111), stack 110 to which the mixture paste has been applied is heated so that the first metal component present at the outer surface of the inner external electrode is molten while the mixture paste is cured, to thus form a plurality of holes.

Stack 110 to which the mixture paste has been applied is preferably heated in a neutral atmosphere such as a nitrogen gas atmosphere or a reducing atmosphere or another non-oxidizing atmosphere. Specifically, stack 110 to which the mixture paste has been applied is preferably heated in an atmosphere in which a concentration of oxygen is not higher than about 100 ppm, for example.

A temperature for heating stack 110 to which the mixture paste has been applied is preferably not lower than a temperature at which a crystal state in an alloy of the first metal component and the second metal component thermodynamically changes (a temperature range in which diffusion of the first metal component of the inner external electrode toward the internal electrode is promoted). Specifically, a temperature for heating stack 110 to which the mixture paste has been applied is preferably not lower than about 450° C., for example. In a case that stack 110 to which the mixture paste has been applied is heated at such a temperature, an alloy layer of internal electrode 140 and the inner external electrode can be formed as extending from an end portion of internal electrode 140 toward the inner external electrode.

In contrast, in a case that a temperature for heating stack 110 to which the mixture paste has been applied is too high, the inner external electrode cannot be formed in a stable manner. Therefore, a temperature for heating stack 110 to which the mixture paste has been applied is preferably lower than about 800° C. and more preferably not higher than about 650° C., for example.

In the present preferred embodiment, a temperature for heating stack 110 to which the mixture paste has been applied and an amount of a metal component contained in the mixture paste are adjusted so as to set an amount of the resin component contained in the inner external electrode to a desired amount. By changing an amount of the inner external electrode itself by adjusting a thickness of the inner external electrode as well, an amount of the resin component contained in the inner external electrode is capable of being set to a desired amount.

Then, an outer external electrode is provided on the inner external electrode by bonding a metal component with plating or the like (S112). Electrolytic plating is preferred as a method of providing an outer external electrode. In the step of providing an outer external electrode (S112), some or all of the plurality of holes are embedded with the metal component of the outer external electrode.

A surface external electrode is further provided on the outer external electrode by bonding a metal component with plating or the like. Electrolytic plating is preferred as a method of providing a surface external electrode.

Through the step of providing an inner external electrode (S111) and the step of providing an outer external electrode (S112) and providing a surface external electrode, the external electrode is provided on a portion of the surface of stack 110 so as to electrically be connected to internal electrode 140 (S110).

Ceramic electronic component 100 according to the present preferred embodiment preferably fabricated through the step of preparing stack 110 (S100) and the step of providing an external electrode (S110).

A position where an external electrode is provided is not limited to opposing end portions of stack 110. A variation in which an external electrode is provided at a position other than opposing end portions of stack 110 will be described below.

Figure 6:
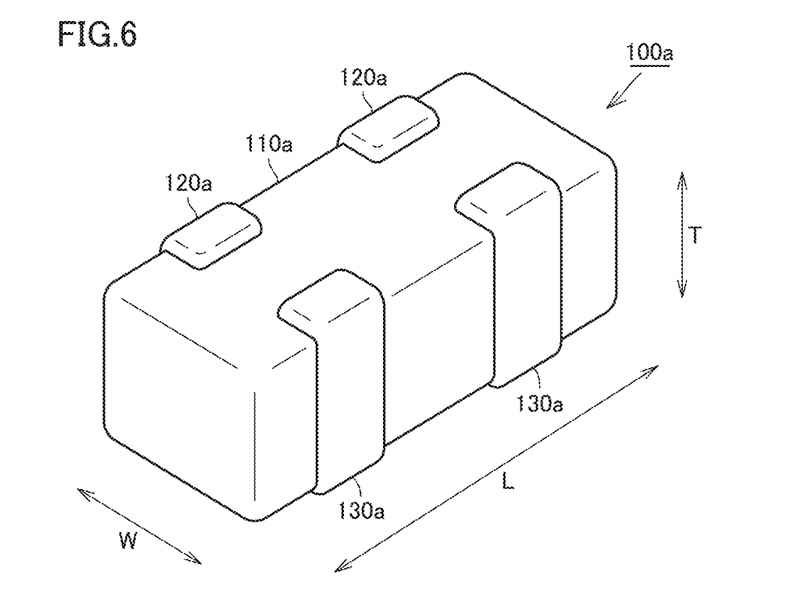
FIG. 6 is a perspective view showing an appearance of a ceramic electronic component in a first variation of a preferred embodiment of the present invention.
Figure 7:
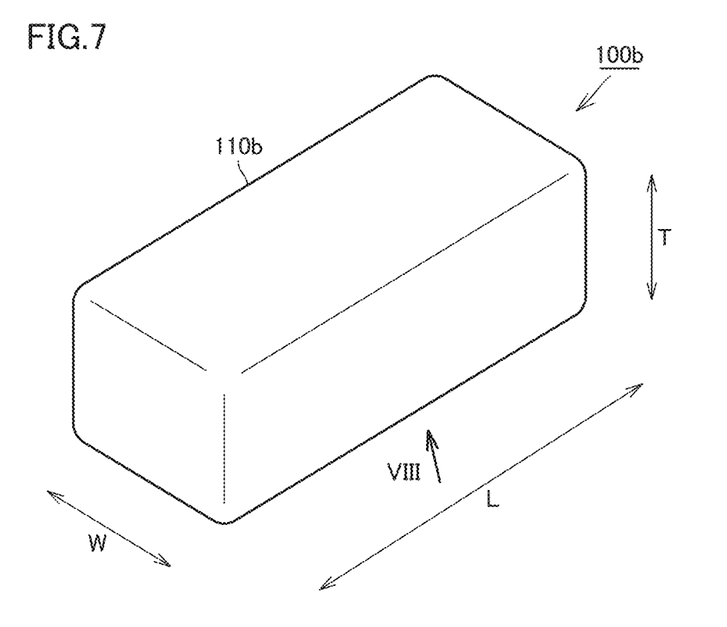
FIG. 7 is a perspective view showing an appearance of a ceramic electronic component in a second variation of a preferred embodiment of the present invention.
Figure 8:
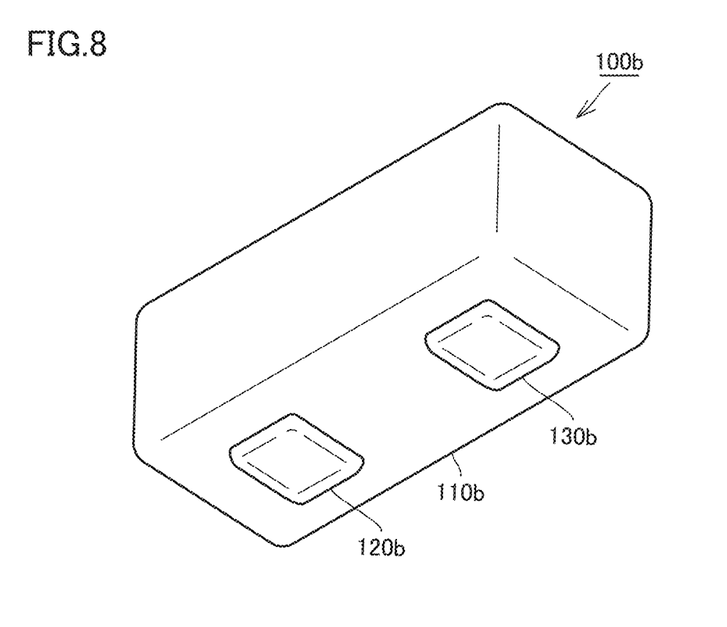
FIG. 8 is a diagram of the ceramic electronic component in FIG. 7 viewed in a direction shown with an arrow VIII.

FIG. 6 is a perspective view showing appearance of a ceramic electronic component in a first variation of the present preferred embodiment. FIG. 7 is a perspective view showing appearance of a ceramic electronic component in a second variation of the present preferred embodiment. FIG. 8 is a diagram of the ceramic electronic component in FIG. 7 viewed in a direction shown with an arrow VIII.

As shown in FIG. 6, in a ceramic electronic component 100a in the first variation, a first external electrode 120a is provided to extend from one side surface of a stack 110a to opposing main surfaces. A second external electrode 130a is provided to extend from one side surface of stack 110a to opposing main surfaces. Ceramic electronic component 100a in the first variation is what is called a capacitor array.

As shown in FIGS. 7 and 8, in a ceramic electronic component 100b in the second variation, a first external electrode 120b is provided on one end surface side on one main surface of stack 110a. A second external electrode 130b is provided on the other end surface side on one main surface of stack 110a. Ceramic electronic component 100b in the second variation is what is called a filletless capacitor.

A non-limiting experimental example in which advantageous effects of preferred embodiments of the present invention were confirmed will be described below.

Four hundred ceramic electronic components each having an outer dimension of a length not smaller than about 1.5 mm and not greater than about 1.8 mm, a width not smaller than about 0.7 mm and not greater than about 1.0 mm, and a thickness not smaller than about 0.7 mm and not greater than about 1.0 mm were fabricated and subjected to an experiment, for example.

Features other than an average particle size of the first metal filler were common in fabrication of each ceramic electronic component. Initially, common features will be described.

$BaTiO_3$ was used as a material for forming a ceramic layer. An average thickness of each ceramic layer was set to about 1.0 μm. Ni was used as a material forming an internal electrode. An external electrode was provided in each of opposing end portions of the stack.

A first metal filler was including Sn and a second metal filler was including Ag. An epoxy resin was used as a resin component. A weight ratio between the first metal filler and the second metal filler in a mixture paste was set to about 3:7.

A volume ratio (a content) of the first metal filler and the second metal filler in total in the cured mixture paste was about 46 volume %. A volume ratio (a content) of the resin component in the cured mixture paste was about 54 volume %.

The stack to which the mixture paste had been applied was heated at 450° C. in a nitrogen gas atmosphere for about 20 minutes. A volume ratio (a content) of the first metal filler and the second metal filler in total in the cured mixture paste was about 77 volume %. A volume ratio (a content) of the resin component in the cured mixture paste was about 23 volume %.

A thickness of an inner external electrode was not smaller than about 20 μm and not greater than about 30 μm (a target value was a median value in the range). An outer external electrode was formed from a Ni plating film having a thickness not smaller than about 2 μm and not greater than about 3 μm (a target value was a median value in the range). A surface external electrode was formed from a Sn plating film having a thickness not smaller than about 2 μm and not greater than about 3 μm (a target value was a median value in the range).

In Example 1, 100 ceramic electronic components were fabricated, with an average particle size of the first metal filler being set to about 1.2 μm. In Example 2, 100 ceramic electronic components were fabricated, with an average particle size of the first metal filler being set to about 2.5 μm. In Comparative Example 1, 100 ceramic electronic components were fabricated, with an average particle size of the first metal filler being set to 3.0 μm. In Comparative Example 2, 100 ceramic electronic components were fabricated, with an average particle size of the first metal filler being set to 4.9 μm.

In Examples 1 and 2 and Comparative Examples 1 and 2, an average opening diameter of the plurality of holes in the inner external electrode which were formed at a boundary between the inner external electrode and the outer external electrode was calculated. A coverage factor of the outer external electrode covering the inner external electrode was calculated. Furthermore, an incidence of solder burst caused in mounting of 100 ceramic electronic components fabricated in each of Examples 1 and 2 and Comparative Examples 1 and 2 was checked.

An average opening diameter of the plurality of holes was calculated as below. Initially, the outer external electrode and the surface external electrode were removed with a nitric acid aqueous solution or the like. Then, a photograph of a portion of the outer surface of the inner external electrode located in a central portion of an end surface of the stack was taken with a scanning electron microscope (SEM).

Figure 9:
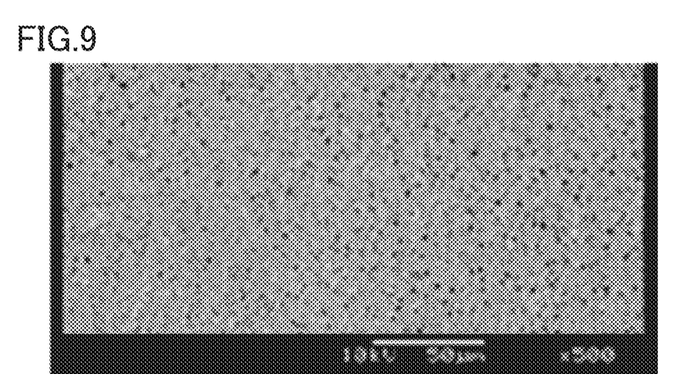
FIG. 9 is a SEM photograph of an outer surface of an inner external electrode.

FIG. 9 is a SEM photograph of the outer surface of the inner external electrode. In FIG. 9, a photograph of an area of about 175 μm long and about 275 μm wide in the outer surface of the inner external electrode was taken at 500× magnification. As shown in FIG. 9, while the white metal component is spread over the outer surface of the inner external electrode, a plurality of black holes with a circular or substantially circular shape are scattered.

By subjecting the SEM photograph to binarization and image processing, an area of opening of each hole was calculated. Assuming that an opening of each hole is in a shape of a perfect circle from the calculated area of opening of each hole, a diameter of the opening of each hole was calculated. By averaging diameters of the opening of the holes, an average opening diameter of the plurality of holes was calculated.

A method below may be used as another method of calculating an average opening diameter of a plurality of holes. Initially, the outer external electrode and the surface external electrode are peeled off through reverse electrolysis. Then, a photograph of a portion of the outer surface of the inner external electrode located in the central portion of the end surface of the stack is taken with a SEM. Specifically, an area of about 100 μm long and about 100 μm wide of the outer surface of the inner external electrode is taken. By subjecting the taken SEM photograph to binarization and image processing, an area of opening of each hole is calculated. Assuming that an opening of each hole is in a shape of a perfect circle from the calculated area of opening of each hole, a diameter of the opening of each hole is calculated. By averaging diameters of the opening of the holes, an average opening diameter of the plurality of holes is calculated.

A method below may be used as yet another method of calculating an average opening diameter of a plurality of holes. Initially, a ceramic electronic component is embedded with a resin. A photograph of an interface between the outer external electrode and the inner external electrode exposed by polishing a cross-section is taken with an optical microscope. By subjecting the taken micrograph to binarization and image processing, an area of opening of a portion estimated to be a hole is calculated. Assuming that an opening of each estimated hole is in a shape of a perfect circle from the calculated area of opening of each estimated hole, a diameter of the opening of each estimated hole is calculated. By averaging diameters of the opening of the estimated holes, an average opening diameter of the plurality of holes is calculated.

A coverage factor of the outer external electrode covering the inner external electrode was calculated as below. Initially, the surface external electrode was removed with a nitric acid aqueous solution or the like. Then, a photograph of a portion of the outer surface of the outer external electrode located in the central portion of the end surface of the stack was taken with a SEM.

Figure 10:
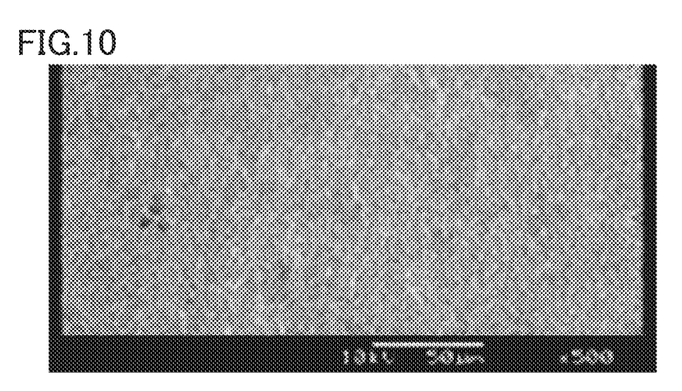
FIG. 10 is a SEM photograph of an outer surface of an outer external electrode.

FIG. 10 is a SEM photograph of the outer surface of the outer external electrode. In FIG. 10, a photograph of an area of about 175 μm long and about 275 μm wide in the outer surface of the outer external electrode was taken at 500× magnification. As shown in FIG. 10, in the outer surface of the inner external electrode, substantially no black defective portion was observed and the outer surface of the inner external electrode was mostly covered with the white outer external electrode.

By subjecting the SEM photograph to binarization and image processing, a coverage area covered with the outer external electrode was calculated. By dividing the coverage area by an area of the photographed area, a coverage factor of the outer external electrode covering the inner external electrode was calculated.

An incidence of solder burst was calculated as below. After a ceramic electronic component was mounted in a reflow step to a glass epoxy substrate, a state of release of solder was visually checked. An incidence of solder burst was calculated by dividing the number of ceramic electronic components in which solder burst had been observed by the number of mounted ceramic electronic components (100) and further multiplying the result by 100.

Table 1 summarizes results of experiments in Examples 1 and 2 and Comparative Examples 1 and 2.

TABLE 1

|  | Average Opening Diameter of Plurality of Holes (μm) | Coverage Factor of Outer External Electrode (%) | Incidence of Solder Burst (%) |
|---|---|---|---|
| Example 1 | 1.2 | 100.0 | 0 |
| Example 2 | 2.5 | 99.8 | 11 |
| Comparative Example 1 | 3.0 | 99.0 | 22 |
| Comparative Example 2 | 4.9 | 98.1 | 23 |

As shown in Table 1, in Example 1, an average opening diameter of a plurality of holes was about 1.2 μm, a coverage factor of the outer external electrode was 100.0%, and an incidence of solder burst was 0%. In Example 2, an average opening diameter of a plurality of holes was about 2.5 μm, a coverage factor of the outer external electrode was about 99.8%, and an incidence of solder burst was about 11%.

In Comparative Example 1, an average opening diameter of a plurality of holes was 3.0 μm, a coverage factor of the outer external electrode was 99.0%, and an incidence of solder burst was 22%. In Comparative Example 2, an average opening diameter of a plurality of holes was 4.9 μm, a coverage factor of the outer external electrode was 98.1%, and an incidence of solder burst was 23%.

It was confirmed in the present experimental example that a coverage factor of the outer external electrode was higher as an average opening diameter of a plurality of holes was smaller. It was confirmed that an incidence of solder burst lowered as a coverage factor of the outer external electrode was higher.

An incidence of solder burst is preferably not higher than about 15%. By setting an average particle size of the first metal filler to about 2.5 μm or smaller, an incidence of solder burst could be not higher than about 15%, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component, comprising:
   a rectangular or substantially rectangular parallelepiped-shaped stack in which a ceramic layer and an internal electrode are alternately stacked; and
   an external electrode provided on a portion of a surface of the stack and electrically connected to the internal electrode; wherein
   the external electrode includes an inner external electrode covering a portion of the surface of the stack and including a mixture of a resin component and a metal component and an outer external electrode covering the inner external electrode and including a metal component;
   the inner external electrode includes a plurality of holes at a boundary between the inner external electrode and the outer external electrode;
   the plurality of holes having an average opening diameter not greater than about 2.5 μm; and
   some or all of the plurality of holes are embedded with the metal component of the outer external electrode.

2. The ceramic electronic component according to claim 1, wherein the outer external electrode covers the inner external electrode at a coverage factor not lower than about 99.8%.

3. The ceramic electronic component according to claim 1, wherein the metal component of the outer external electrode is Ni.

4. The ceramic electronic component according to claim 1, wherein the method component of the inner external electrode includes a first metal component and a second metal component higher in melting point than the first metal component.

5. The ceramic electronic component according to claim 4, wherein the first metal component is Sn and the second metal component is Ag or Cu.

6. The ceramic electronic component according to claim 1, wherein the ceramic electronic component has an outer dimension of a length not smaller than about 0.57 mm and not greater than about 0.65 mm, a width not smaller than about 0.27 mm and not greater than about 0.35 mm, and a thickness not smaller than about 0.27 mm and not greater than about 0.35 mm, and a volume occupied by the resin component in the inner external electrode is not higher than about $1.0 \times 10^{-6}$ ml.

7. The ceramic electronic component according to claim 1, wherein the ceramic electronic component has an outer dimension of a length not smaller than about 0.95 mm and not greater than about 1.25 mm, a width not smaller than about 0.45 mm and not greater than about 0.70 mm, and a thickness not smaller than about 0.45 mm and not greater than about 0.70 mm, and a volume occupied by the resin component in the inner external electrode is not higher than about $3.3 \times 10^{-6}$ ml.

8. The ceramic electronic component according to claim 1, wherein the ceramic electronic component has an outer dimension of a length not smaller than about 1.5 mm and not greater than about 1.8 mm, a width not smaller than about 0.7 mm and not greater than about 1.0 mm, and a thickness not smaller than about 0.7 mm and not greater than about 1.0 mm, and a volume occupied by the resin component in the inner external electrode is not higher than about $8.4 \times 10^{-6}$ ml.

* * * * *